United States Patent
Yoshida et al.

(10) Patent No.: US 8,487,510 B2
(45) Date of Patent: Jul. 16, 2013

(54) DRIVING DEVICE

(75) Inventors: Ryuichi Yoshida, Sakai (JP); Takayuki Hoshino, Osaka (JP); Tomoyuki Yuasa, Osaka (JP)

(73) Assignee: Konica Minolta Opto, Inc. (JP)

( * ) Notice: Subject to any disclaimer, the term of this patent is extended or adjusted under 35 U.S.C. 154(b) by 296 days.

(21) Appl. No.: 12/996,869

(22) PCT Filed: May 26, 2009

(86) PCT No.: PCT/JP2009/059584
§ 371 (c)(1),
(2), (4) Date: Dec. 8, 2010

(87) PCT Pub. No.: WO2009/150937
PCT Pub. Date: Dec. 17, 2009

(65) Prior Publication Data
US 2011/0080121 A1   Apr. 7, 2011

(30) Foreign Application Priority Data
Jun. 11, 2008   (JP) ................................. 2008-152538

(51) Int. Cl.
*H01L 41/06* (2006.01)
*H02N 2/06* (2006.01)

(52) U.S. Cl.
CPC .................................... *H02N 2/065* (2013.01)
USPC ........................................................ 310/317

(58) Field of Classification Search
CPC ......... H02N 2/0075; H02N 2/008; H02N 2/06; H02N 2/065; H02N 2/067
USPC ................................................. 310/315, 317
See application file for complete search history.

(56) References Cited

U.S. PATENT DOCUMENTS

| | | | | |
|---|---|---|---|---|
| 6,411,008 | B1 | 6/2002 | Otsubo et al. | 310/316.01 |
| 6,727,635 | B2 * | 4/2004 | Okamoto et al. | 310/316.01 |
| 2002/0033322 | A1 | 3/2002 | Nakano et al. | 200/237 |

FOREIGN PATENT DOCUMENTS

| | | |
|---|---|---|
| JP | 1-264579 A | 10/1989 |
| JP | 7-264879 A | 10/1995 |
| JP | 2000-92873 A | 3/2000 |
| JP | 2002-95272 A | 3/2002 |
| JP | 2003-33052 A | 1/2003 |
| WO | WO 2009/150937 A1 | 12/2009 |

* cited by examiner

*Primary Examiner* — Derek Rosenau
(74) *Attorney, Agent, or Firm* — Cantor Colburn LLP

(57) ABSTRACT

Provided is a driving device having an electromechanical transducer, a driving member, a moving member and a driving circuit. The driving circuit outputs a driving voltage at a frequency lower than that where the driving speed of the moving member is at maximum, and changes the drive frequency of the driving voltage so that the drive frequency has a negative correlative relationship with the ambient temperature. The change rate of the drive frequency to a change of the ambient temperature in the negative correlative relationship is larger than a change rate of a frequency where the driving speed of the moving member is at maximum to an increase of the ambient temperature, and the change rate permits the driving speed of the moving member to increase when the ambient temperature increases.

7 Claims, 4 Drawing Sheets

DRIVING DEVICE

RELATED APPLICATIONS

This application is a U.S. National Stage Application under 35U.S.C. 371 of International Application No. PCT/JP2009/059584, filed with Japanese Patent Office on May 26, 2009, which claims priority to Japanese Patent Application No. 2008-152538, filed Jun. 11, 2008.

TECHNICAL FIELD

The present invention relates to driving devices, and in particular to an vibration actuator using a piezoelectric element.

BACKGROUND ART

There is known an actuator in which a bar-like driving member is asymmetrically vibrated in its shaft direction by asymmetric expansion/contraction of a piezoelectric element and whereby a moving member friction-engaged to the driving member is slidingly moved in a single direction. Since the expansion/contraction characteristics of the piezoelectric element depend on the ambient temperature, there is a problem that the driving speed of the actuator is varied depending on the temperature change.

Patent document 1 discloses that with an ultrasonic motor using a piezoelectric element, the driving is performed at a frequency selected so as to maximize the driving speed at the ambient temperature when driving. There is a problem that the driving speed is typically increased with temperature. In addition, with vibration actuators, the frequency-dependent driving speed characteristics do not conform to the frequency-dependent driving force characteristics. As a result, there is a problem that the driving force depends on the chive frequency appropriate to the ambient temperature.

RELATED ART DOCUMENT

Patent Document

Patent document 1: Japanese Laid-Open Patent Application Publication No. H01-264579

DISCLOSURE OF THE INVENTION

Object of the Invention

In view of the foregoing problems, an object of the present invention to provide an driving device in which a driving speed and a driving force is stable with respect to a temperature change.

Means for Solving the Object

In order to solve the aforementioned problems, a driving device of the present invention comprises: an electromechanical transducer configured to expand and contract when a voltage is applied; a driving member configured to be reciprocally displaced by the expansion and the contraction of the electromechanical transducer; a moving member slidably held on the driving member, and a driving circuit configured to apply a periodically varying drive voltage to the electromechanical transducer, wherein the drive frequency of the drive voltage is changed rate in a negative correlation with an ambient temperature, a change rate of the drive frequency with respect to an change in the ambient temperature according to the negative correlation is larger than a change rate of a frequency at which a driving speed of the moving member with respect to a rise in the ambient temperature.

With this configuration, the driving is performed at a frequency lower than the speed at which the driving speed is at its maximum, and the driving speed does not vary much between individual devices. In addition, with this driving device, the frequency is varied depending on the temperature change by a greater amount than a change rate of the frequency at which the driving speed is maximized, and the driving speed thus does not change much.

In addition, in the driving device according to the present invention, the change rate of the drive frequency with respect to the change in the ambient temperature according to the correlation may also be a change rate with which the driving speed of the moving member increases when the ambient temperature rises.

With this configuration, since the driving speed is increased with the ambient temperature, the driving force does not vary much.

In addition, in the driving device according to the present invention, the change rate of the drive frequency with respect to the change in the ambient temperature according to the negative correlation may be smaller than a change rate with which an average of an error between the driving speed of the moving member when the ambient temperature changes and an average of the driving speed of the moving member when the ambient temperature is at a predetermined standard temperature is at a minimum, and is larger than a change rate with which an average of an error between the driving force when the ambient temperature changes and the an average of the driving force of the moving member when the ambient temperature is at a predetermined standard temperature is at a minimum.

The difference of driving speed between individual vibration actuators becomes progressively larger with temperature. To address this issue, if the compensation is performed using a correction value smaller than the correction value with which the average deviation between the driving speeds of the moving members at a varied temperature and at a standard temperature is minimized, the variation between individual products is reduced when a great amount of driving devices are produced. In addition, the effect of correction to the driving force is at a peak at a frequency lower than the frequency at which the effect of correction to the driving speed is at a peak, and the variation between individuals is greater at a lower frequency at the peak position. For this reason, if the frequency is corrected in the area in which the gradient is smaller than the gradient with which the average deviation (average error of correction) of the driving speed is at minimum, and in which area the gradient is greater than the gradient with which the average deviation of the driving force is at minimum, the variations of the effects of correction of both the driving speed and the driving force is small, and a driving device having no variation in characteristics is provided.

In addition, in the driving device according to the present invention, the drive frequency may be expressed, using coefficient B, by the equation: $fd = fo - fo \cdot B \cdot \Delta T$, where: $fd$ Hz is the drive frequency; $fo$ Hz is the drive frequency when the ambient temperature is at a predetermined standard temperature; and $\Delta T\,°C$. is a difference between the ambient temperature and the standard temperature, and the following relationship may be satisfied: $0.0005 \leq B \leq 0.004$.

In the piezoelectric actuator used for small camera modules, the average deviation of driving force is substantially at its minimum when the gradient of the drive frequency with respect to the ambient temperature is 0.0005, and the average deviation of driving speed is substantially at its minimum when the gradient of the driving speed with respect to the ambient temperature is 0.004. When the drive frequency is corrected using the gradient between those two values, can be provided a driving device having driving characteristics with no variation.

In addition, in the driving device according to the present invention, the ambient temperature may be divided into predetermined sections, and the frequency of the driving voltage may be determined based on temperatures each representing each of the sections.

This arrangement allows the control to be simple.

In addition, in the driving device according to the present invention, the frequency of the drive voltage may be determined by changing a frequency of a clock for controlling the drive circuit depending on the ambient temperature.

Typical oscillator has negative temperature characteristics, and when using these characteristics, this arrangement can provide a driving device which has no variation in characteristics and is stable with respect to temperature change.

Advantage of the Invention

As described above, according to the present invention, the drive frequency is adjusted so as to slightly increase the driving speed with increase in the ambient temperature, and with the result that a driving device is provided which is generally stable in driving characteristics with the decreased fall of driving force and variation of driving speed between independent driving devices.

DESCRIPTION OF THE NUMERALS

With reference to the drawings, an embodiment according to the present invention will be described bellow.

Figure 1:
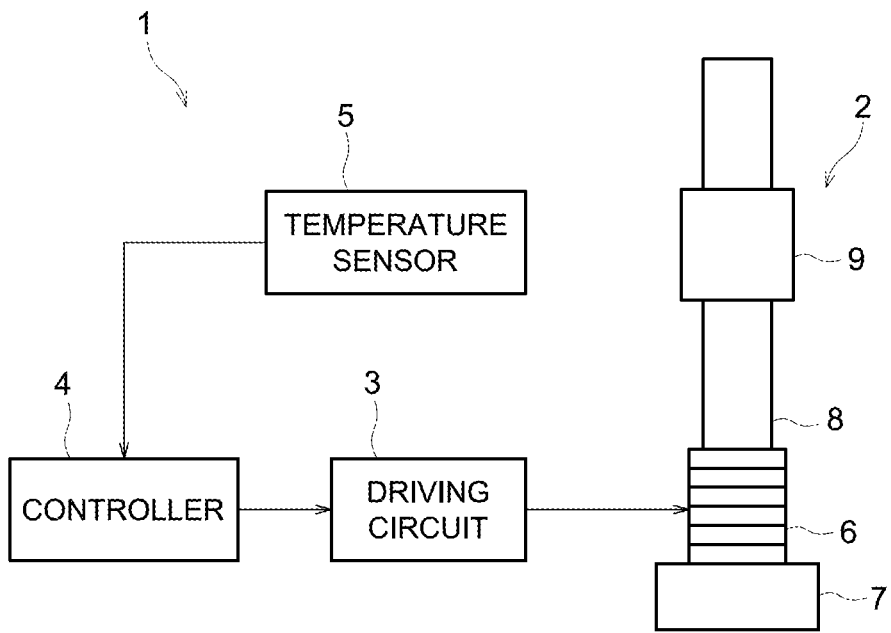
FIG. 1 is a schematic diagram showing a driving device of a first embodiment according to the present invention.

FIG. 1 shows a structure of a driving device 1 according to the present invention. The driving device 1 includes a piezoelectric actuator 2; a driving circuit 3 for supplying a periodic drive voltage to the piezoelectric actuator 2; a controller 4 for controlling the operation of the driving circuit 3 so as to determine a waveform and a frequency of the drive voltage; and a temperature sensor 5 for detecting the ambient temperature of the piezoelectric actuator.

The piezoelectric actuator 2 includes: a piezoelectric element (electromechanical transducer) 6 configured to extend/contract in response to the input drive voltage; a weight 7 attached to one end of the piezoelectric element 6; a bar-like driving member 8 with its one end attached to the other end of the piezoelectric element 6; and a moving member 9 frictionally-engaged to the driving member 8. The driving member 8 is reciprocally displaced in the shaft direction due to the expansion/contraction of the piezoelectric element 6. The moving member 9 is displaced along with the driving member 8 when the driving member 8 moves slowly, and is slidingly displaced with respect to the driving member 8 due to an inertia force when the driving member 8 moves quickly.

Therefore, in order to move the moving member 9 toward the forefront of the shaft, the driving member 8 is repeatedly and reciprocally displaced with a slow expansion and a quick contraction. Instead, in order to move the moving member 9 toward the piezoelectric element 6 side, the driving member 8 is repeatedly and reciprocally displaced with a quick expansion and a slow contraction.

Figure 2:
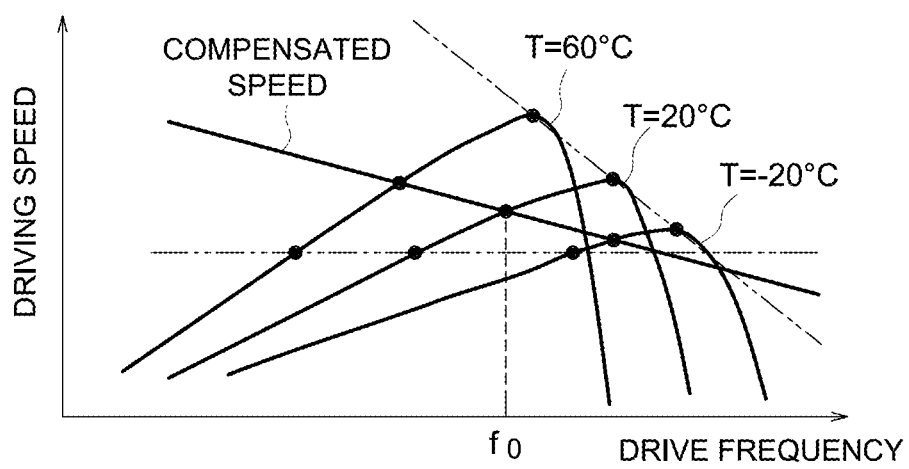
FIG. 2 is a diagram showing variation of frequency-dependent driving speed characteristics of the driving device of FIG. 1.

FIG. 2 shows the temperature-dependent characteristics of a driving speed of the driving device 1 in other words a driving (displacement) speed of the moving member 9 at plural ambient temperatures. As illustrated in the figure, the temperature-dependent characteristics of driving speed of the driving device 1 have a higher peak frequency and a lower peak speed for lower ambient temperature.

For the driving device 1, as shown in the figure, the drive frequency is decreased so as to increase the driving speed, with increasing ambient temperature, at a lower degree than the change rate of the peak speed. In more particular, drive frequency fd Hz is described as $fd = fo - fo \cdot B \cdot \Delta T$ using temperature correction rate B (=0.0012) as a coefficient, where a rated frequency at a standard temperature To is assumed to be fo Hz; and the deviation between the ambient temperature and the standard temperature To is assumed to be $\Delta T$ ° C. For the driving device 1, the ambient temperature 20° C. is standard temperature To, and the performances at standard temperature To are the rated values.

Figure 3:
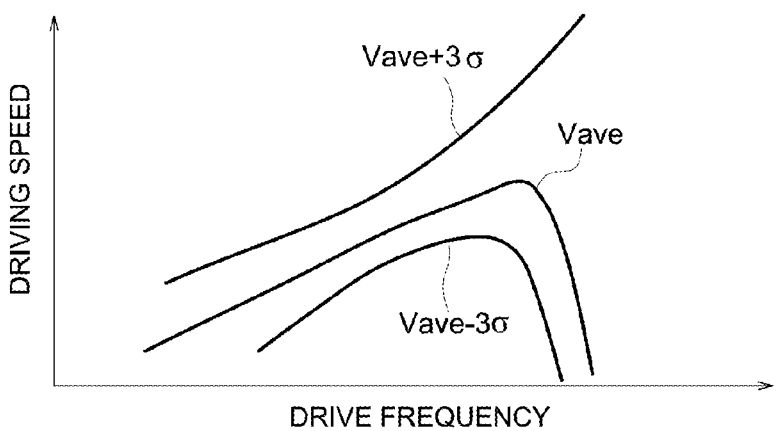
FIG. 3 is a diagram showing variation of frequency-dependent driving speed characteristics of individual driving devices of FIG. 1.

With reference to FIG. 2, it may be thought that positioning control is easy when the drive frequency is adjusted so that the driving speed does not depend on the ambient temperature, in the driving device 1. However, when many driving devices 1 are industrially produced, the individual driving speed is varied. FIG. 3 shows the frequency-dependencies of the average driving speed (Vave) and the average driving speed ±3σ(standard deviation) both at the standard temperature in the case where a great number of driving devices 1 are manufactured. As shown in the figure, the variation of the driving speed of the driving device 1 is larger in the high frequency region. For this reason, rated frequency fo is set at the frequency lower than the frequency at which the driving speed is at its maximum, in the driving device 1.

Figure 4:
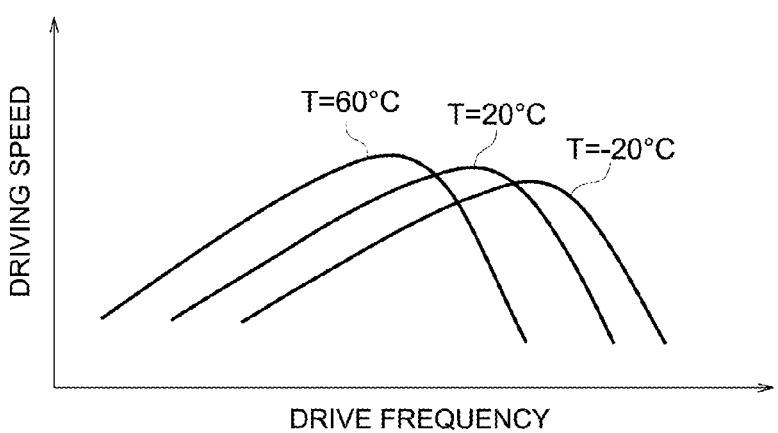
FIG. 4 is a diagram showing variation of frequency-dependent driving force characteristics of individual driving devices of FIG. 1.

FIG. 4 shows the ambient-temperature-dependent variation of the driving force (drive tongue of the moving member) of the driving device 1. Although the peak frequency of the driving force is decreased with increasing temperature, the peak values are not as different as the driving speed.

Figure 5:
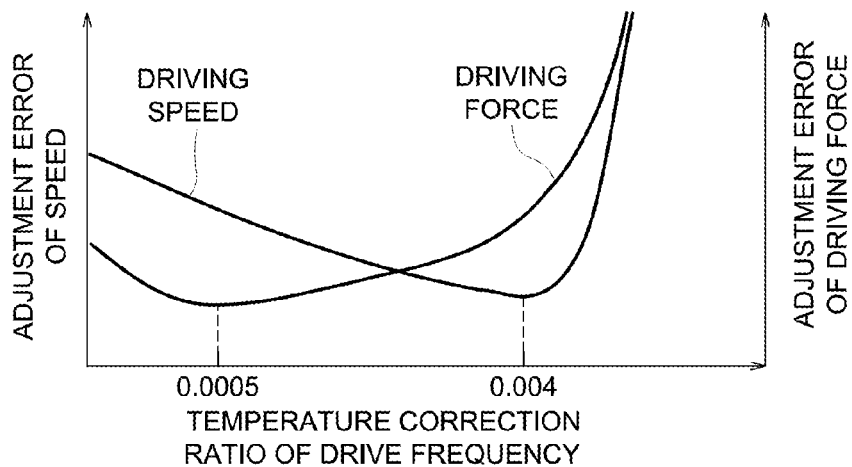
FIG. 5 is a diagram showing adjustment errors in the driving speed and the driving force with respect to the correction rate of the drive frequency in the driving device of FIG. 1.

FIG. 5 shows an adjustment error of speed and an adjustment error of driving force with respect to different temperature correction ratios B in the drive apparatus 1, where the adjustment error of speed is a root mean square of the difference between the average driving speed at a certain temperature deviation ΔT and the average driving speed at the standard temperature To; and the adjustment error of driving force is a root mean square of the difference between the average driving force at the certain temperature deviation ΔT and the average driving force at the standard temperature To. In the above description, the average driving force is an average of driving force in the case where a great number of driving devices 1 are manufactured.

As shown in the figure, the adjustment error of the driving speed is at its minimum when temperature correction rate B is 0.004, and steeply increases where temperature correction rate B is greater than 0.004. In addition, the driving force is at its minimum when temperature correction rate B is 0.0005. For this reason, in order to decrease the change in the driving force as well as in the driving speed, temperature correction rate B can be 0.0005 or greater and 0.004 or smaller, in the driving device 1.

In addition, in the driving device 1, the ambient temperature may be divided into predetermined sections in advance, and the temperature correction of drive frequency fd may be determined based on the representative temperatures each representing each of the predetermined sections.

Figure 6:
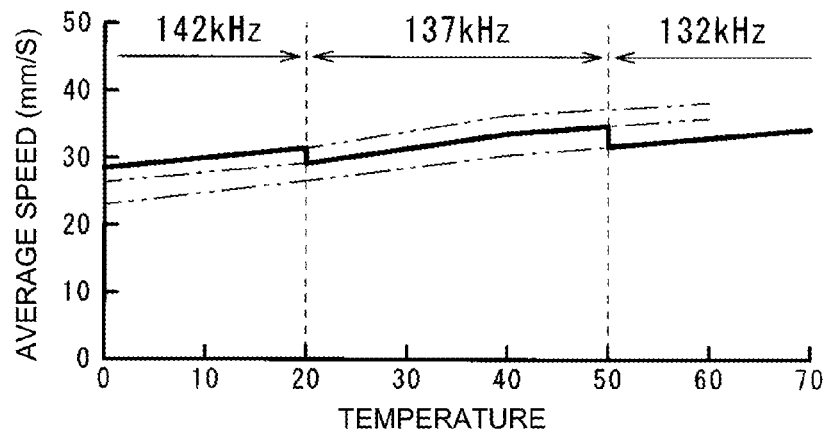
FIG. 6 is a graph showing the change in driving speed with respect to temperature in a second embodiment of the present invention.
Figure 7:
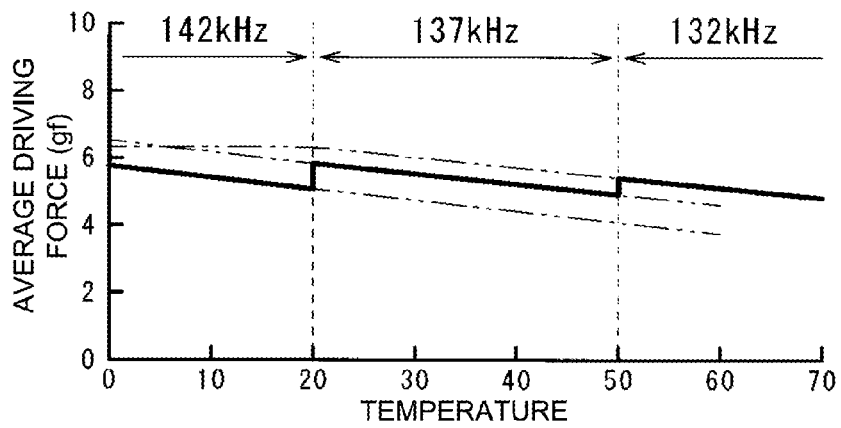
FIG. 7 is a graph showing the change in driving force with respect to temperature in the second embodiment of the present invention.
Figure 8:
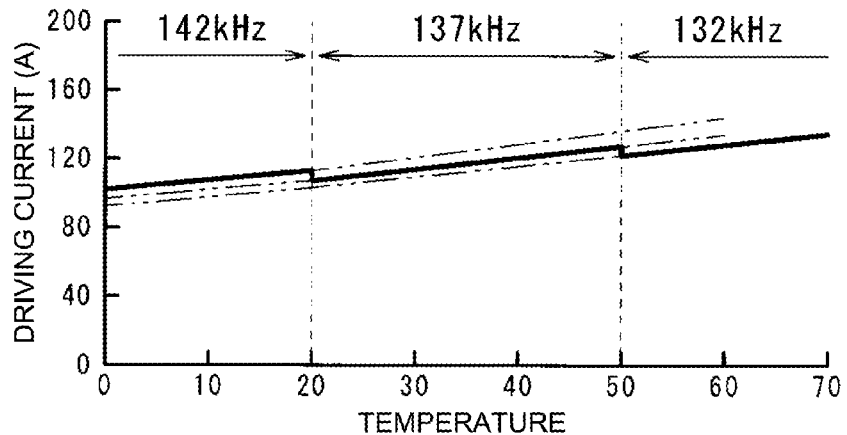
FIG. 8 is a graph showing the change in driving current with respect to temperature in the second embodiment of the present invention.

FIGS. 6 through 8 show the temperature-dependent characteristics of a driving device according to a second embodiment, where standard temperature To=35° C., rated frequency fo=137 kHz, and the sections are a low temperature section lower than 20° C., a normal temperature section equal to or higher than 20° C. and equal to or lower than 50, and a high temperature section higher than 50° C.

According to this embodiment, the representative temperature for the normal temperature section is 35° C., that for the low temperature section is 5° C., and that for the high temperature section is 65° C. In addition, the drive frequency for the normal temperature section is the rated frequency fo=137kHz, that for the low temperature section is 142kHz, and that for the high temperature section is 147kHz. Temperature correction rate B is approximately 0.0012.

As shown in FIG. 6, in this embodiment, the driving speed is increased with the ambient temperature, and it is discontinuously changed at 20° C. and 50° C., where the sections are adjacent to each other. This arrangement allows the difference in the driving speed between sections to be small. Similarly, as shown in FIG. 7, the deviation range of the driving forces is made to be small in different sections. Further, as shown in FIG. 8, the driving current is discontinuous between sections due to this correction of drive frequency.

Since the drive frequency is adjusted depending on the sections of the ambient temperature, the control is easy without need for cumbersome change of the drive frequency.

Figure 9:
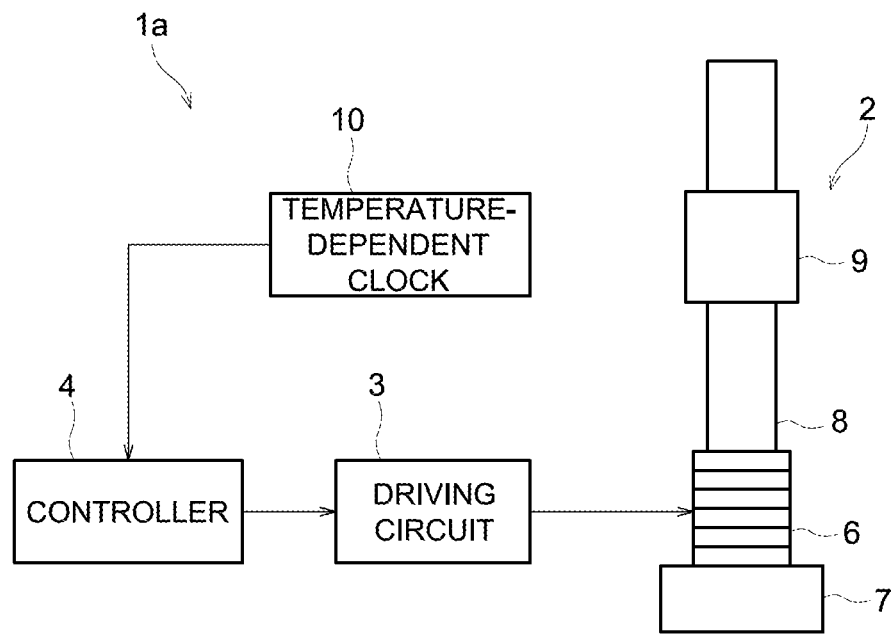
FIG. 9 is a schematic diagram showing a driving device of a third embodiment according to the present invention.

FIG. 9 shows a structure of a driving device 1a of a third embodiment according to the present invention. In the description of this embodiment, the like reference numeral is assigned to the like structural element, and the description is not repeated The driving device 1a has not temperature sensor, but a temperature-dependent clock 10, whose oscillation frequency decreases with increasing temperature, is provided in the vicinity of the piezoelectric actuator 2, where the controller operates by a clock signal output from the temperature-dependent 10.

In general, clock oscillators such as a crystal oscillator have characteristics in which the oscillation frequency tends to decrease with increasing temperature, and manufacturers thereof take measures to prevent frequency change with temperature. However, in this embodiment, the driving speed and the driving force of the driving device 1a is stabilized by intentionally decreasing the clock frequency with increasing temperature.

DESCRIPTION OF THE NUMERALS

1: Driving device
2: Piezoelectric actuator
3: Driving circuit
4: Controller
5: Temperature sensor
6: Piezoelectric element (Electromechanical transducer)
7: Weight
8: Driving member
9: Moving member
10: Temperature-dependent clock

What is claimed is:

1. A driving device, comprising:
an electromechanical transducer configured to expand and contract depending on an applied drive voltage;
a driving member configured to be reciprocally displaced by the expansion and the contraction of the electromechanical transducer;
a moving member slidably held on the driving member;
a driving circuit configured to apply the drive voltage having a periodically varying voltage to the electromechanical transducer at a drive frequency lower than a peak frequency at which a driving speed of the moving member is at a maximum speed while controlling a frequency of the drive voltage in a negative correlation to an ambient temperature,
wherein the drive frequency is lowered so that the drive speed of the moving member increases, with increase in the ambient temperature, at a lower degree than a change rate of the maximum speed with the increase in the ambient temperature.

2. The driving device of claim 1, wherein a frequency temperature compensation coefficient, which is the change rate of the drive frequency with respect to the change in the ambient temperature according to the negative correlation, is smaller than a frequency temperature compensation coefficient with which a difference between an average driving speed of the moving member when the ambient temperature changes and an average driving speed of the moving member when the ambient temperature is at a predetermined standard temperature is at a minimum, and is larger than a frequency temperature compensation coefficient with which a difference between an average driving force when the ambient temperature changes and an average driving force of the moving member when the ambient temperature is at a predetermined standard temperature is at a minimum.

3. The driving device of claim 1, wherein coefficient B satisfies the following relationship:
$0.0005 \leq B \leq 0.004$; and
$fd = fo - fo \cdot B \cdot \Delta T$
where:
fd is the drive frequency in Hz when the ambient temperature is at T1 in ° C.;
fo is the drive frequency in Hz when the ambient temperature T1 is at a predetermined standard temperature; and
ΔT is a difference between ambient temperature T1 and the predetermined standard temperature.

4. The driving device of claim 1, wherein the ambient temperature is divided into predetermined sections, and the drive frequency is determined based on temperatures each representing each of the sections.

5. The driving device of claim 1, wherein the drive frequency is determined by changing a frequency of a clock for controlling the drive circuit depending on the ambient temperature.

6. The driving device of claim 1, wherein the drive circuit controls the drive frequency of the drive voltage based on a temperature dependent clock whose oscillation frequency decreases with an increase in temperature.

7. The driving device of claim 1, further comprising:
a temperature sensor configured to detect an ambient temperature of the electromechanical transducer,
wherein the drive circuit controls the drive frequency of the drive voltage based on the ambient temperature detected by the temperature sensor.

* * * * *